United States Patent
Yu et al.

(10) Patent No.: US 8,251,720 B2
(45) Date of Patent: Aug. 28, 2012

(54) PUSH-PUSH CARD CONNECTOR

(75) Inventors: Jian-Fei Yu, Kunshan (CN); Qi-Jun Zhao, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 32 days.

(21) Appl. No.: 13/005,953

(22) Filed: Jan. 13, 2011

(65) Prior Publication Data

US 2011/0189875 A1    Aug. 4, 2011

(51) Int. Cl.
*H01R 13/62* (2006.01)

(52) U.S. Cl. ......................................................... 439/159

(58) Field of Classification Search ................... 439/159, 439/155, 923, 160
See application file for complete search history.

(56) References Cited

U.S. PATENT DOCUMENTS

| | | | |
|---|---|---|---|
| 7,077,705 B2 * | 7/2006 | Harasawa | 439/630 |
| 7,118,397 B1 * | 10/2006 | Su et al. | 439/159 |
| 7,632,117 B1 * | 12/2009 | Van der Steen | 439/159 |
| 2009/0246993 A1 | 10/2009 | Yu et al. | |

* cited by examiner

*Primary Examiner* — Tulsidas C Patel
*Assistant Examiner* — Phuongchi Nguyen
(74) *Attorney, Agent, or Firm* — Wei Te Chung; Andrew C. Cheng; Ming Chieh Chang

(57) ABSTRACT

A card connector for connecting an electronic card, comprises an insulative housing and an ejector. The insulative housing defines a receiving space extending backwardly along a front to back direction for receiving the electronic card. The ejector comprises a slider, a spring sandwiched between the slider and a rear end of the insulative housing and a pole for controlling movement of the slider. The slider includes a first protrusion and a second protrusion, the card connector has a first guiding groove engaging with the first protrusion and a second guiding groove engaging with the second protrusion, the slider defines a locking portion extending inwardly into the receiving space, the first guiding groove provides an escaping groove for the first protrusion thereby the slider can move along a insertion direction of the electronic card steadily.

19 Claims, 11 Drawing Sheets

PUSH-PUSH CARD CONNECTOR

BACKGROUND OF THE INVENTION

1. Field of the Invention

The present invention relates to a card connector, more particularly to a push-push card connector with a locking portion which can lock an electronic card when the electronic card is inserted.

2. Description of Related Art

Small electronic cards with a large memory are used in many kinds of portable electrical products, such as digital cameras, PDAs, mobile phones etc. The electrical product usually has a circuit board with a card connector mounted thereon for electrically connecting the electronic card.

US. Pat. 20090246993 A1 discloses a card connector includes an insulative housing with a plurality of contacts retained therein, an ejector mounted on the insulative housing and a metal shell covering the insulative housing. The metal shell and the insulative housing define a receiving space for receiving an electronic card. The ejector includes a slider mounted on the insulative housing, a spring sandwiched between the slider and a rear end of the insulative housing and a pole fixed between the rear end of the insulative housing and the slider. The slider can move along a front to back direction to bring the electronic card in or out of the card connector. The slider has a locking portion for locking the electronic card and a guiding portion extending upwardly from the locking portion. The shell defines a guiding groove for preventing the slider from moving along a left to right direction and an escaping groove for receiving the guiding portion when the electronic card is inserted into the receiving space at the beginning. However, when the insertion force of the electronic card is bigger, the locking portion may have an excessive deformation. So, the guiding portion maybe still locates in the escaping groove, so the slider can not move and the electronic card will be inserted into the card connector difficulty.

Hence, an improved card connector is desired to solve the problem above.

BRIEF SUMMARY OF THE INVENTION

According to one aspect of the present invention, a card connector for connecting an electronic card, comprises an insulative housing, a plurality of contacts retained in the insulative housing and an ejector. The insulative housing defines a receiving space extending backwardly along a front to back direction for receiving the electronic card and a bottom wall located under the receiving space. The bottom wall has a sliding path thereof. The ejector comprises a slider moving on the sliding path, a spring sandwiched between the slider and a rear end of the insulative housing, and a pole for controlling the slider to be positioned at a first position or a second position farther away from a front end of the insulative housing than the first position. Wherein the slider includes a first protrusion and a second protrusion protruding outwardly thereof. The card connector has a first guiding groove engaging with the first protrusion and a second guiding groove engaging with the second protrusion for resisting a movement of the slider. The first guiding groove provides an escaping groove for the first protrusion. When the electronic card is inserted into the receiving space, a front part of the electronic card resists the slider and the slider rotates outwardly around the second protrusion for making the first protrusion move into the escaping groove.

According to another aspect of the present invention, a card connector comprises an insulative housing, a plurality of contacts retained in the insulative housing and an ejector. The insulative housing defines a receiving space for receiving an electronic card and a heart-shaped recess formed on a top side thereof. The ejector comprises a movable slider, a spring urging the slider forwardly, and a pole located between the slider and a rear end of the insulative housing. The pole includes a first part positioned on the slider and a second part moving in the heart-shaped recess. Wherein the card connector has a first guiding groove and a second guiding groove. The slider includes a first protrusion which can move in the first guiding groove and a second protrusion which can move in the second guiding groove. The slider defines a locking portion extending into the receiving space. The first guiding groove includes a longitudinal groove parallel to the second guiding groove and an escaping groove extends outwardly from a front end of the longitudinal groove. When the electronic card is inserted into the receiving space, a front part of the electronic card resists the locking portion, and then the slider rotates outwardly around the second protrusion and make the locking portion move in the escaping groove.

Other objects, advantages and novel features of the present invention will become more apparent from the following detailed description of the present embodiment when taken in conjunction with the accompanying drawings.

DETAILED DESCRIPTION OF THE PREFERRED EMBODIMENTS

Figure 1:
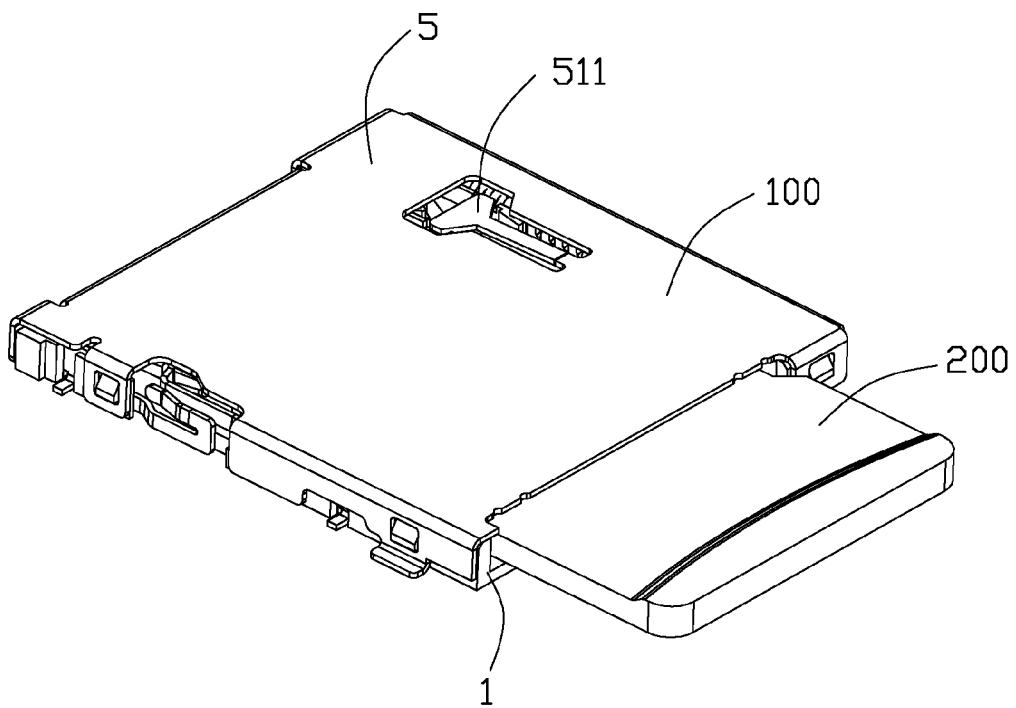
FIG. 1 is an assembled perspective view of a card connector according to a first embodiment of the present invention.

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-6, a card connector 100 for connecting an electronic card 200 according to a first embodiment of the present invention is disclosed. The card connector 100 comprises an insulative housing 1, a plurality of contacts 2 held in the insulative housing 1, a switch 3 installed in one side of the insulative housing 1 for detecting whether the electronic card 200 is inserted into the card connector 100, an ejector 4 retained in the insulative housing 1, and a metal shell 5 covering the insulative housing 1 and forming a receiving space 10 with the insulative housing 1. The electronic card 200 is a Micro SD card in the present invention, and comprises a locking hole 201 at a first side thereof for locking with the card connector 100.

Figure 5:
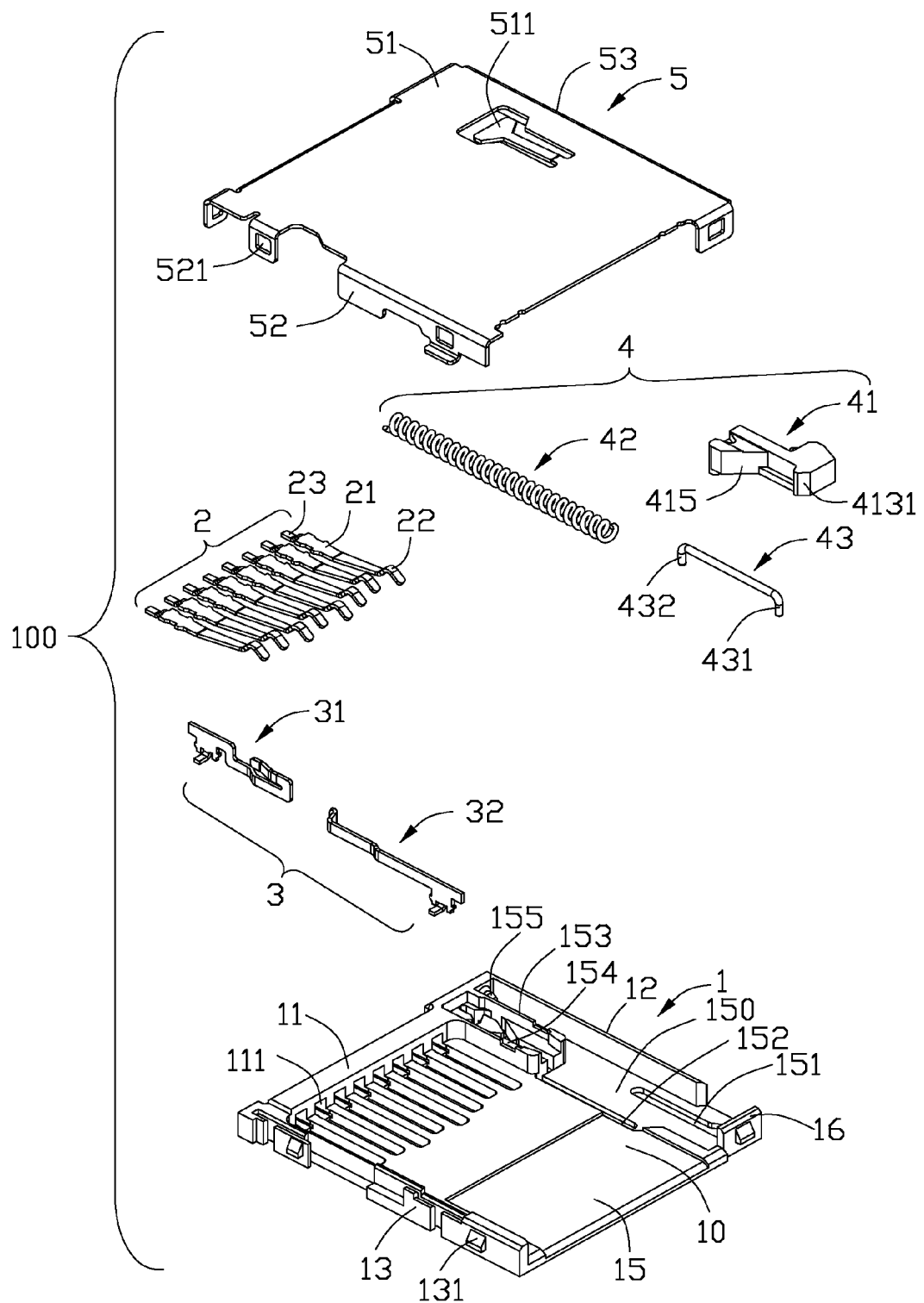
FIG. 5 is an exploded perspective view of the card connector shown in FIG. 1.

Referring to FIG. 5, the insulative housing 1 includes a rear wall 11, a bottom wall 15, and two opposite side walls extending upwardly from two lateral sides of the bottom wall 15. The receiving space 10 extends backwardly along a front to back direction for receiving the electronic card 200. The side walls include a first side wall 12 and a second side wall 13. The rear wall 11 defines a plurality of passageways 111 for retaining the contacts 2 and a first post 155. The first and second side walls 12, 13 define a plurality of protuberances 131 for engaging with the metal shell 5. A stopping wall 16 is located in front of the bottom wall 15 for resisting a movement of the ejector 4 along the front to back direction.

Figure 6:
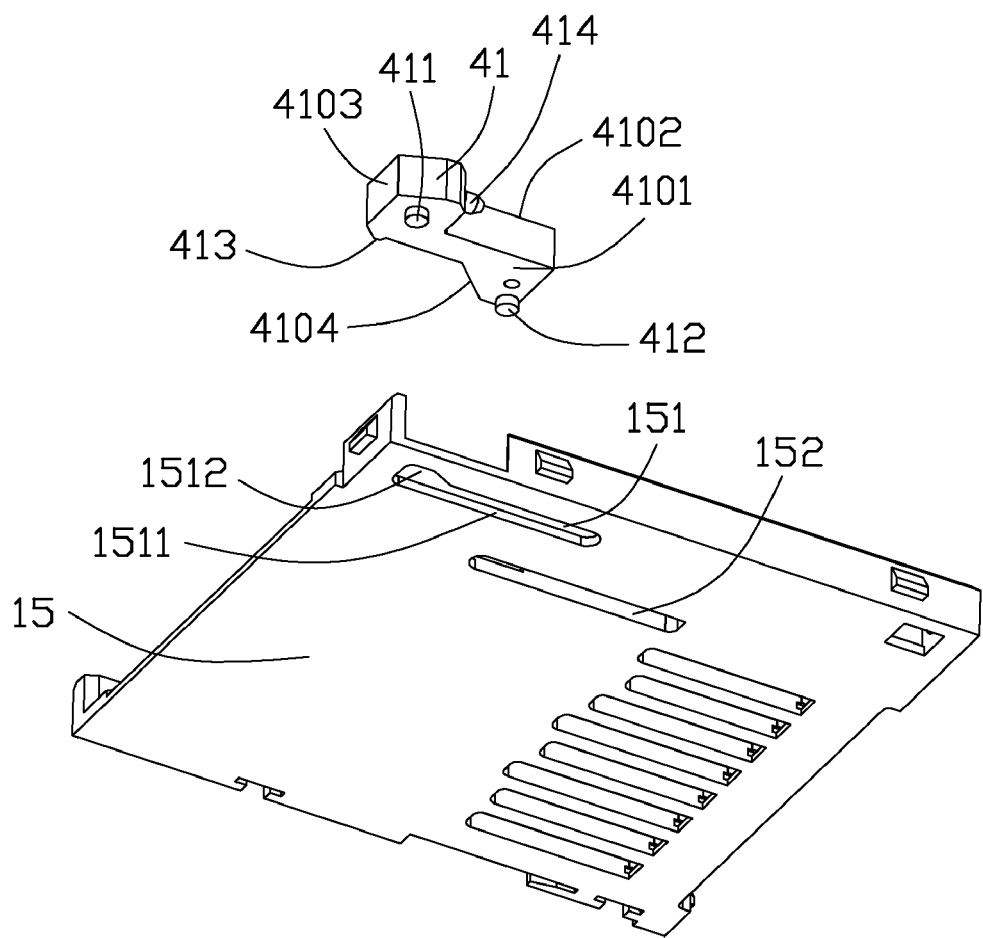
FIG. 6 is a perspective view of an insulative housing and a slider of the card connector shown in FIG. 1.
Figure 7:
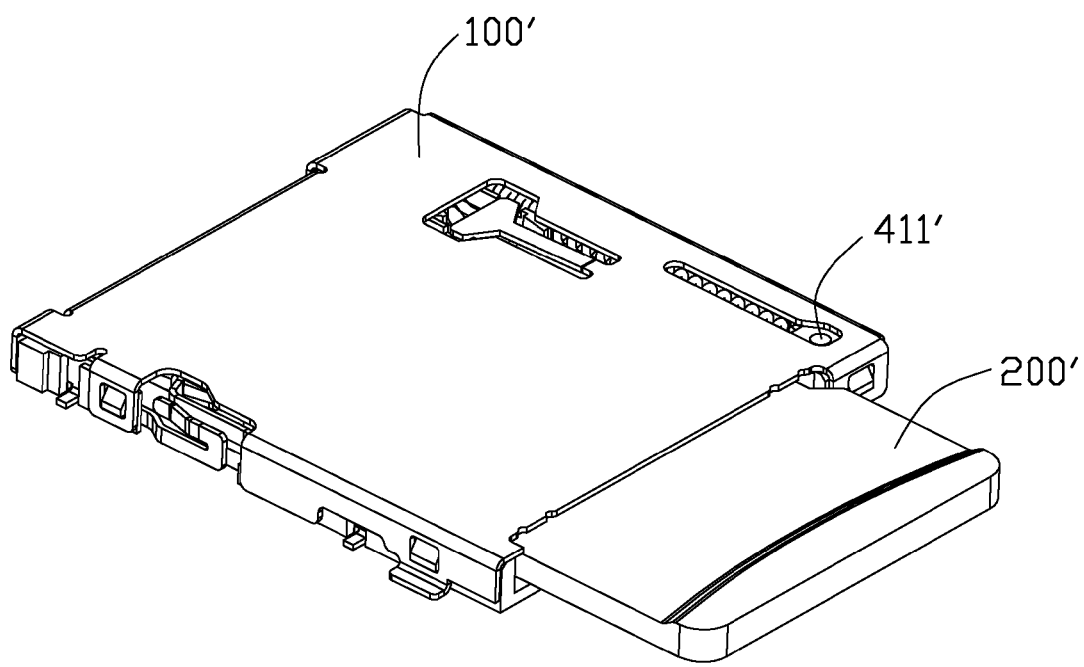
FIG. 7 is a perspective view of another card connector and an electronic card according to a second embodiment of the present invention.
Figure 8:
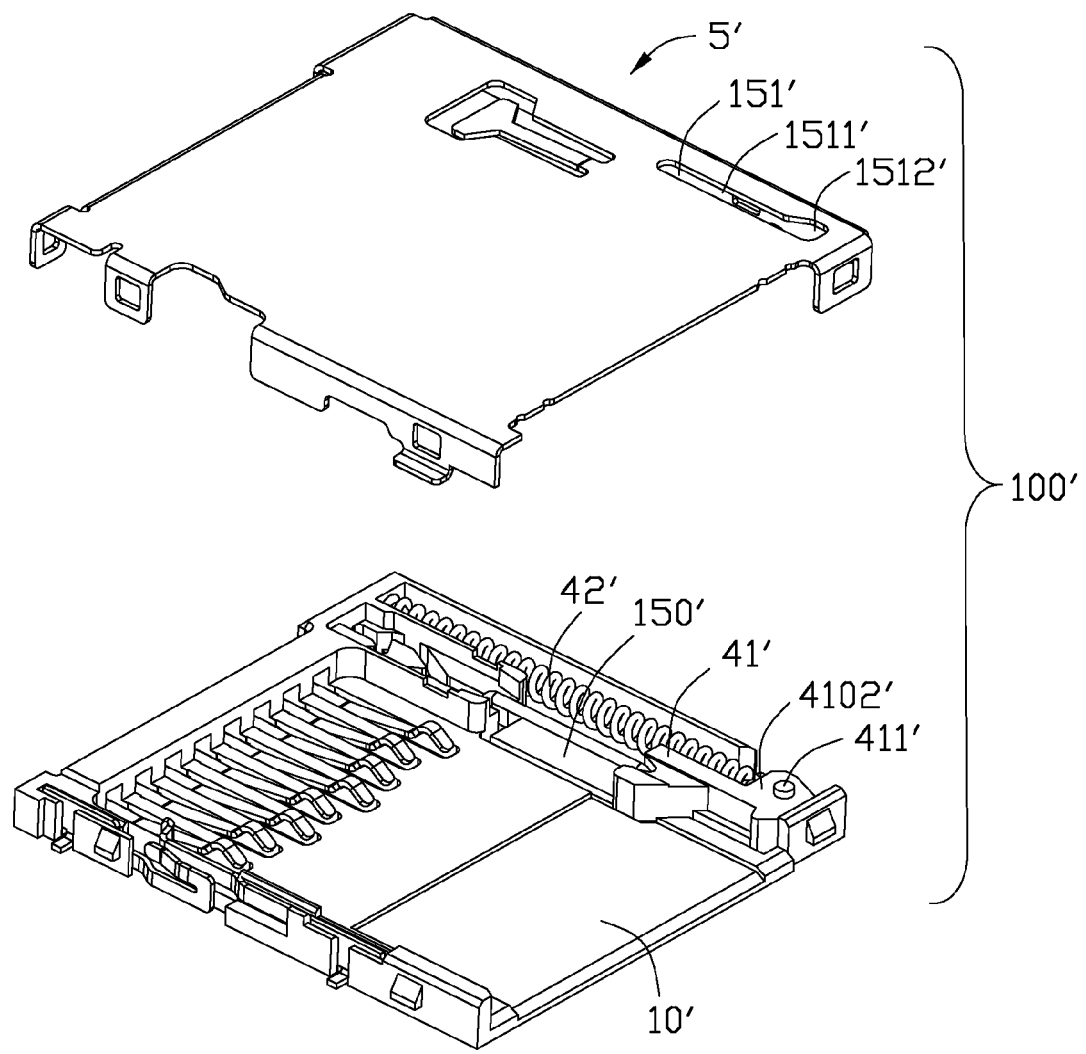
FIG. 8 is a partially exploded view of the card connector shown in FIG. 7.
Figure 9:
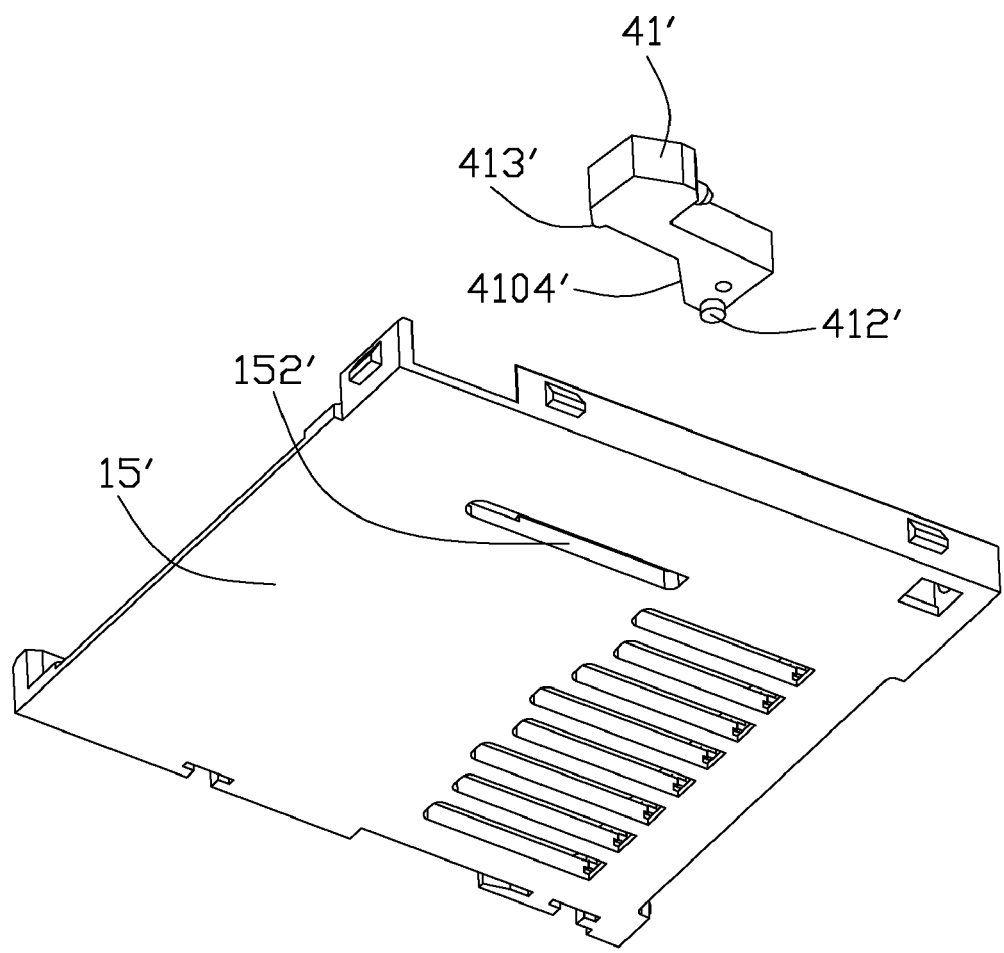
FIG. 9 is a perspective view of an insulative housing and a slider of the card connector shown in FIG. 7.
Figure 10:
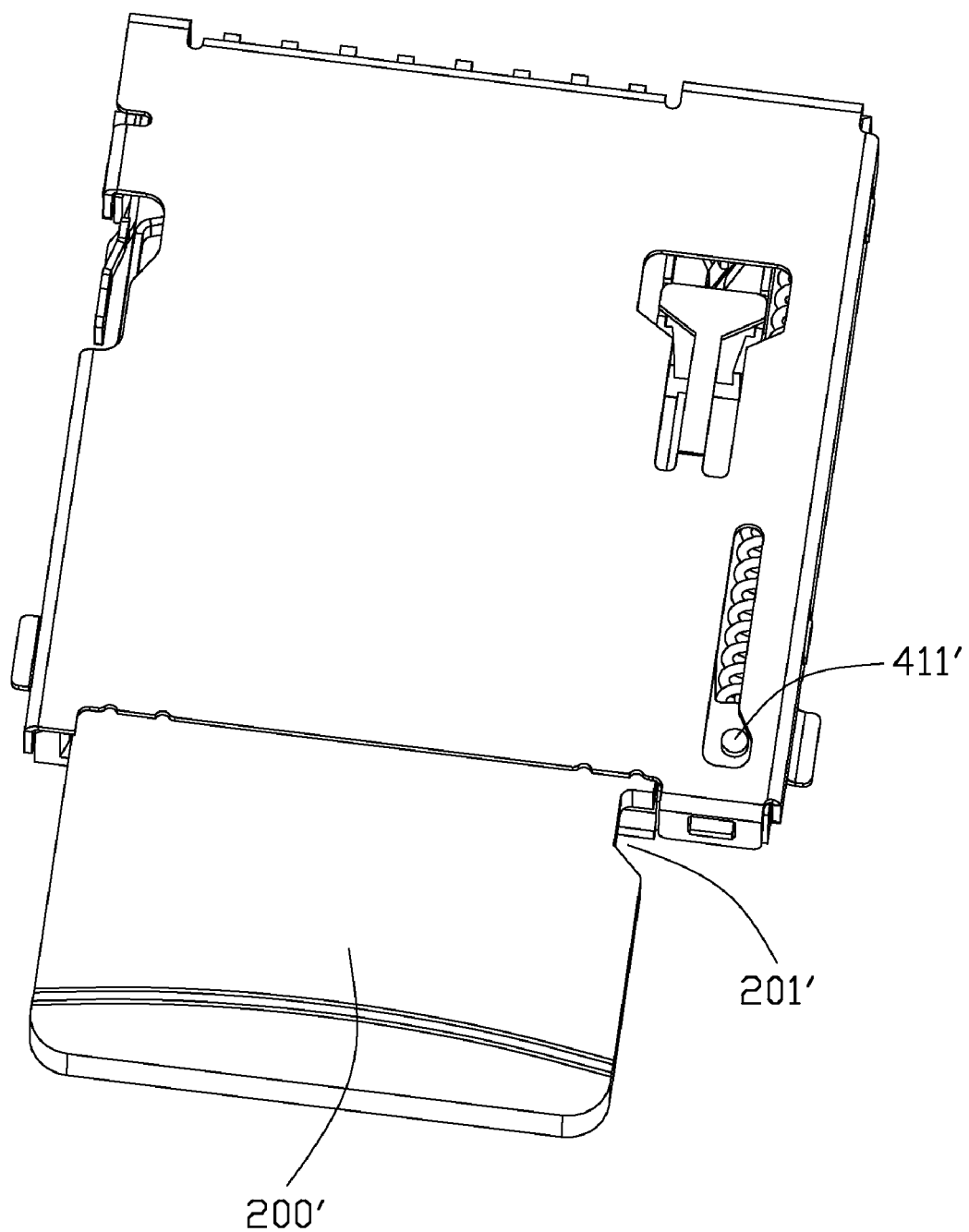
FIG. 10 is a perspective view of the card connector shown in FIG. 7 with an electronic card inserted into the card connector and pushing a slider at the beginning.
Figure 11:
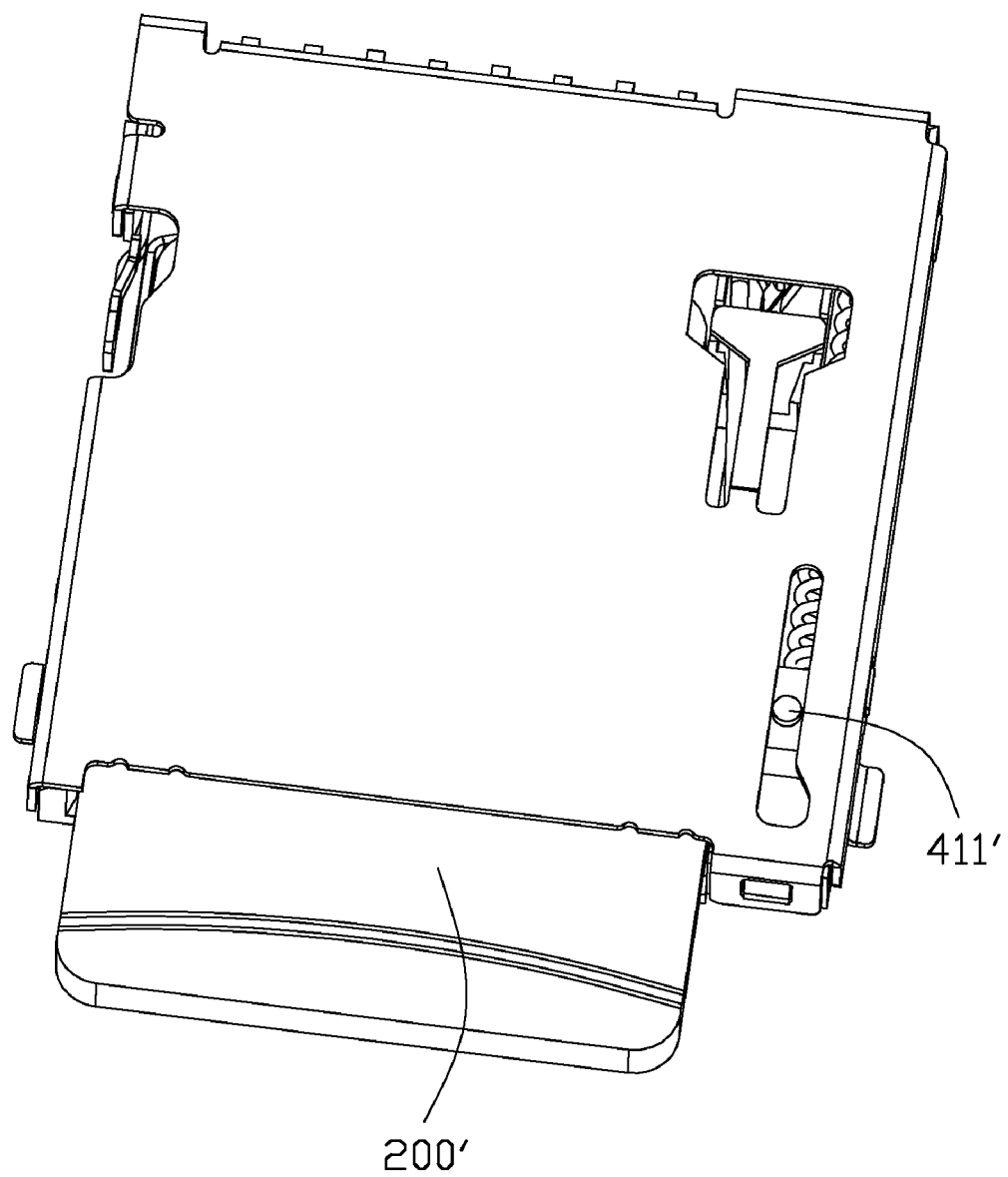
FIG. 11 is a perspective view of the card connector shown in FIG. 7 with an electronic card fully inserted into the card connector.

Referring to FIGS. 5-6, the bottom wall 15 includes a first guiding groove 151 close to the first side wall 12 and a second guiding groove 152 located at an inner side of the first guiding groove 151. The first and second guiding grooves 151, 152 go through the bottom wall 15 along an up to down direction. The first guiding groove 151 is located at a front side and an outer side of the second guiding groove 152. The first guiding groove 151 includes a longitudinal groove 1511 and an escaping groove 1512 deviating from the longitudinal groove 1511 along a left to right direction which is opposite to the front to back direction. The escaping groove 1512 connects with the longitudinal groove 1511. The escaping groove 1512 expands outwardly from a front end of the longitudinal groove 1511. The longitudinal groove 1511 and the second guiding groove 152 are positioned in parallel with each other and extend along an insertion direction of the electronic card 200.

The bottom wall 15 has a sliding path 150 therein. The second guiding groove 152 is located at an inner side of the sliding path 150. The first guiding groove 151 is close to the stopping wall 16 and is located at a rear end of the stopping wall 16. In present embodiment, the bottom wall 15 is thin, so the first and the second guiding grooves 151, 152 are designed to go through the bottom wall 15. In other embodiment, the first and second guiding grooves 151, 152 may not go through the bottom wall 15 when the bottom wall 15 is much thicker. The bottom wall further includes a first installing groove 153 close to the first side wall 12 and a heart-shaped recess 154 formed on a top side of the insulative housing 1.

Referring to FIG. 5, the contacts 2 are arranged on the insulative housing 1 along a transverse direction. Each contact 2 includes a securing portion 21 retained in the passageways 111, a contacting portion 22 protruding from the securing portion 21 into the receiving space 10 for connecting with the electronic card 200 and a soldering portion 23 extending from the securing portion 21 out of the insulative housing 1. The switch 3 is installed on the second side wall 13. The switch 3 includes a first switch 31 and a second switch 32 which can abut against the first switch 31.

Referring to FIG. 5, the ejector 4 is disposed on the bottom wall 15 of the insulative housing 1. The ejector 4 comprises a slider 41 moving on the sliding path 150 of the insulative housing 1, a spring 42 sandwiched between the slider 41 and a rear end of the insulative housing 1 and a pole 43 for controlling the slider 41 to be positioned at a first position or a second position farther away from a front end of the insulative housing 1 than the first position. The pole 43 can move in the heart-shaped recess 154. The spring 42 can urge the slider 41 forwardly. The first position is a start position of the slider 41 before the electronic card 200 being inserted into the electronic card connector 100. The second position is a final position of the slider 41 where the contacts 2 electrically connect with the electronic card 200.

Continue to refer to FIGS. 5-6, the slider 41 includes a body portion 410 being parallel to the sliding path 150, a first protrusion 411 engaging with the first guiding groove 151, a second protrusion 412 engaging with the second guiding groove 152 and a second post 414 for installing the spring 42. The first and second protrusions 411, 412 extend downwardly from the body portion 410. The body portion 410 includes a bottom plane 4101 engaging with the sliding path 150, a top plane 4102 which is opposite to the bottom plane 4101, a connecting plane 4103 abutting against the stopping wall 16 before the electronic card 200 is inserted into the receiving space 10, and an engaging plane 4104 located between the bottom plane 4101 and the top plane 4102 for engaging with a front part of the electronic card 200 when the electronic card 200 is inserted into the receiving space 10. The first and second protrusions 411, 412 extend downwardly from the bottom plane 4101. The first protrusion 411 is located between the connecting plane 4103 and the engaging plane 4104. The second protrusion 412 is located in back of the engaging plane 4104. The first protrusion 411 is located at an outer side and a front side of the second protrusion 412.

Referring to FIG. 6, the body portion 410 defines a locking portion 413 extending inwardly into the receiving space 10 from a front end of the slider 41. The locking portion 413 defines an inclined plane 4131. The inclined plane 4131 abuts against the electronic card 200 when the electronic card 200 is inserted into the receiving space 10 at the beginning. The body portion 410 further includes an engaging portion 415 extending from a rear end thereof into the receiving space 10 for abutting against the front part of the electronic card 200. The engaging plane 4104 is formed on the engaging portion 415. The second protrusion 412 extends downwardly from the engaging portion 415.

Figure 2:
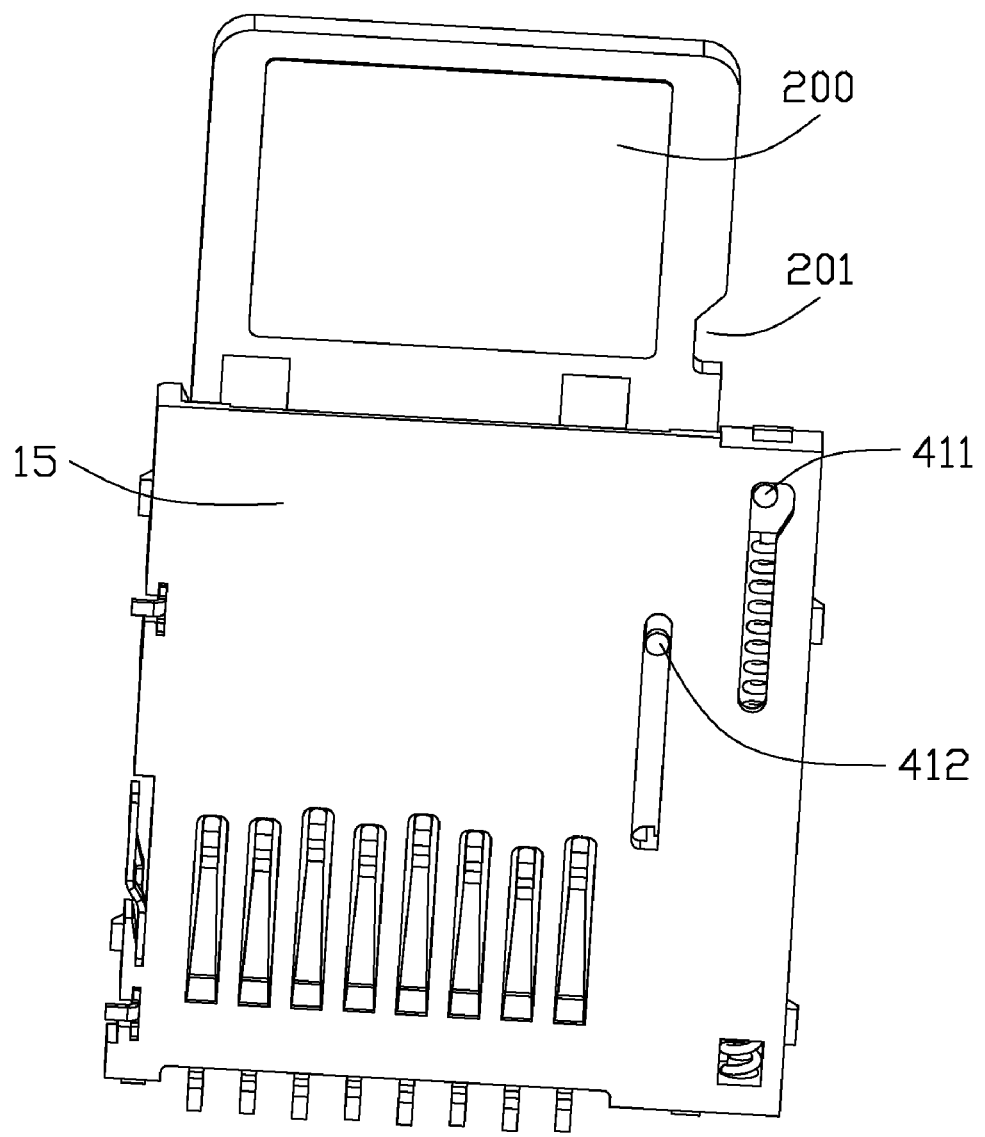
FIG. 2 is a bottom view of the card connector shown in FIG. 1 with an electronic card inserted into the card connector but not abutting against a slider thereof.
Figure 3:
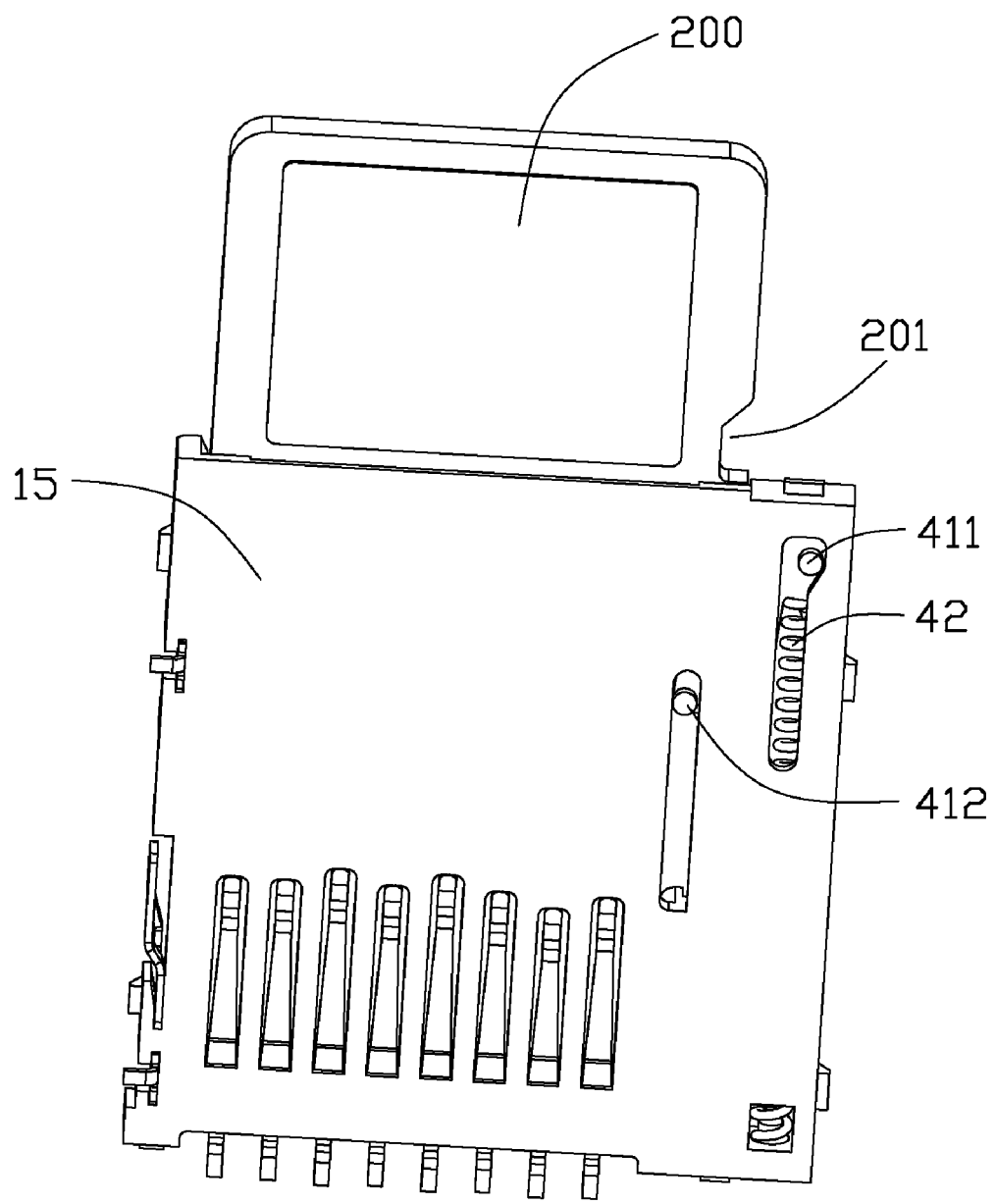
FIG. 3 is another bottom view of the card connector shown in FIG. 1 with an electronic card inserted into the card connector and pushing the slider at the beginning.
Figure 4:
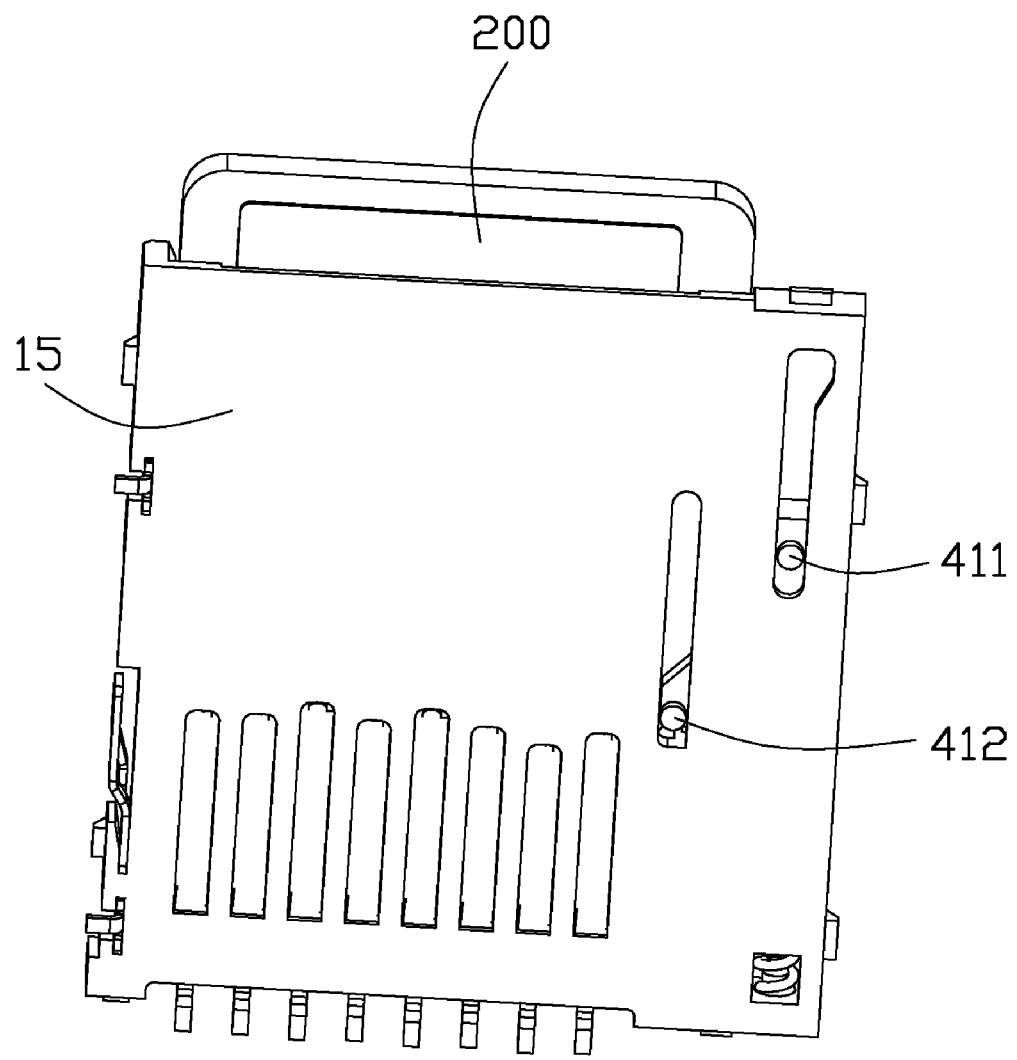
FIG. 4 is another bottom view of the card connector shown in FIG. 1 with an electronic card fully inserted into the card connector.

Referring to FIGS. 2-4, when the electronic card 200 is inserted into the receiving space 10 normally, the front part of the electronic card 200 resists the locking portion 413 outwardly, so the slider 41 rotates outwardly around the second protrusion 412, the first protrusion 411 moves into the escaping groove 1512 from the longitudinal groove 1511; then when the electronic card 200 continues moving, the slider 41 returns to the longitudinal groove 1511 because of the restoral force of the spring 42, the locking portion 413 will lock into the locking hole 201 of the electronic card 200. The front part of the electronic card 200 pushes the slider 41 to move backwardly along the electronic card insertion direction. The first and second protrusions 411, 412 move backwardly along the longitudinal groove 1511 and the second guiding groove 152 respectively. Under this condition, the escaping groove 1512 provides a deformation space for the slider 41. The escaping groove 1512 prevents the electronic card 200 from hardly interfering with the locking portion 413. The longitudinal groove 1511 guides the slider 41 to move unceasingly along the insertion direction of the electronic card 200, so the locking portion 413 locks with the locking hole 201 of the electronic card 200 steadily. The first and second guiding grooves 151, 152 can restrict the slider 41 along the left to right direction.

Referring to FIG. 5, the spring 42 is positioned in the first installing groove 153. One end of the spring 42 is disposed on the first post 155 of the insulative housing 1, and another end of the spring 42 is fixed on the second post 414 of the slider 41 for securing the spring 42 between the insulative housing 1 and the slider 41. The spring 42 is compressed when the electronic card 200 is inserted into the card connector 100 and pushes the slider 41 backwardly along the insertion direction, and is released when the electronic card 200 is ejected from the card connector 100.

Referring to FIG. 5, the pole 43 includes a first part 431 located in front and a second part 432 located in the wings. The first part 431 is installed in the slider 41. The second part 432 can move in the heart-shaped recess 154 by the electronic card 200 inserting into the receiving space 10.

Referring to FIG. 5, the metal shell 5 is made of a piece of metal sheet, and comprises a top wall 51, a first side portion 52 and a second side portion 53. The first and second side portions 52, 53 bend downwardly from two lateral sides of the top wall 51. The top wall 51 has a flexible plate 511 for restricting the pole 43 moving upwardly. The first and second side portions 52, 53 include a plurality of through holes 521 for engaging with the protuberance 131 of the insulative housing 1.

Referring to FIGS. 7-11, a card connector 100' according to a second embodiment of the present invention is disclosed. The card connectors 100, 100' of the two embodiments are similar approximately, a small difference is that: a first guiding groove 151' is formed on a shell 5'. A first protrusion 411' extends upwardly from a top plane 4102' of a slider 41' for engaging with the first guiding groove 151'. A second guiding groove 152' is formed on a bottom wall 15'. A second protrusion 412' extends downwardly from the slider 41' for engaging with Page of the second guiding groove 152'. The slider 41' moves on a sliding path 150'. The first guiding groove 151' includes a longitudinal groove 1511' and an escaping groove 1512' deviating from the longitudinal groove 1511' along a left to right direction which is opposite to the front to back direction. The escaping groove 1512' connects with the longitudinal groove 1511'. The escaping groove 1512' expands outwardly from a front end of the longitudinal groove 1511'.

Referring to FIGS. 8-11, the slider 41' has a locking portion 413' extending inwardly into a receiving space 10' from the front end of the slider 41', when an electronic card 200' is inserted into the receiving space 10' normally, a front part of the electronic card 200' resists the locking portion 413' outwardly, so the slider 41' rotates outwardly around the second protrusion 412', and the first protrusion 411' moves into the escaping groove 1512' from the longitudinal groove 1511'; then when the electronic card 200' continues moving, the electronic card 200' abuts against an engaging plane 4104' of the slider 41', and the slider 41' returns to the longitudinal groove 1511' because of the restoral force of a spring 42', the locking portion 413' will lock into a locking hole 201' of the electronic card 200'. The front part of the electronic card 200' pushes the slider 41' moving backwardly along the electronic card insertion direction. The first and second protrusions 411', 412' move backwardly along the longitudinal groove 1511' and the second guiding groove 152' respectively. Under this condition, the escaping groove 1512' provides a deformation space for the slider 41'. The escaping groove 1512' prevents the electronic card 200' from hardly interfering with the locking portion 413'. The longitudinal groove 1511' guides the slider 41' to move unceasingly along the insertion direction of the electronic card 200', so the locking portion 413' locks with the locking hole 201' of the electronic card 200' steadily. The first and second guiding grooves 151', 152' can restrict the slider 41' along the left to right direction.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

What is claimed is:

1. A card connector for connecting an electronic card, comprising:
an insulative housing defining a receiving space extending backwardly along a front to back direction for receiving the electronic card and a bottom wall located under the receiving space, the bottom wall having a sliding path thereof;
a plurality of contacts retained in the insulative housing; and
an ejector comprising a slider moving on the sliding path, a spring sandwiched between the slider and a rear end of the insulative housing, and a pole for controlling the slider to be positioned at a first position or a second position farther away from a front end of the insulative housing than the first position;
wherein the slider includes a first protrusion and a second protrusion protruding outwardly thereof, the card connector has a first guiding groove engaging with the first protrusion and a second guiding groove engaging with the second protrusion for resisting a movement of the slider, the first guiding groove provides an escaping groove for the first protrusion, when the electronic card is inserted into the receiving space, a front part of the electronic card resists the slider and the slider rotates outwardly around the second protrusion for making the first protrusion move into the escaping groove.

2. The card connector as claimed in claim 1, wherein the first guiding groove goes through the bottom wall from an up to down direction, the first protrusion extends downwardly from the body portion and slides in the first guiding groove along with the slider.

3. The card connector as claimed in claim 1, further comprising a metal shell covering the insulative housing, wherein the first guiding groove is formed on the shell and extends along a front to back direction.

4. The card connector as claimed in claim 1, wherein the first guiding groove is located at a front side and an outer side of the second guiding groove.

5. The card connector as claimed in claim 1, wherein the second guiding groove is located in the bottom wall, the second protrusion extends downwardly from the body portion and slides in the second guiding groove along with the slider.

6. The card connector as claimed in claim 5, wherein the body portion includes an engaging portion extending from a rear end thereof into the receiving space for abutting against a front part of the electronic card, the second protrusion extends downwardly from a lower surface of the engaging portion, the second protrusion is located at a back side and an inner side of the first protrusion.

7. The card connector as claimed in claim 1, wherein the first guiding groove includes a longitudinal groove, the escaping groove deviates from the longitudinal groove and connects with the longitudinal groove.

8. The card connector as claimed in claim 7, wherein the longitudinal groove and the second guiding groove are positioned in parallel with each other and extend along an insertion direction of the electronic card.

9. The card connector as claimed in claim 7, wherein the slider has a locking position extending into the receiving space from a front end thereof, the locking portion defines a inclined plane, the inclined plane abuts against the electronic card when the electronic card is inserted into the receiving space in the beginning and makes the first protrusion move into the escaping groove from the longitudinal groove.

10. A card connector comprising:
an insulative housing defining a receiving space for receiving an electronic card and a heart-shaped recess formed on a top side thereof;
a plurality of contacts retained in the insulative housing; and
an ejector comprising a movable slider, a spring urging the slider forwardly, and a pole located between the slider and a rear end of the insulative housing, the pole including a first part positioned on the slider and a second part moving in the heart-shaped recess;
wherein the card connector has a first guiding groove and a second guiding groove, the slider includes a first protrusion which can move in the first guiding groove and a second protrusion which can move in the second guiding groove, the slider defines a locking portion extending into the receiving space, the first guiding groove includes a longitudinal groove parallel to the second guiding groove and an escaping groove extends outwardly from a front end of the longitudinal groove, when the electronic card is inserted into the receiving space, a front part of the electronic card resists the locking portion, and then the slider rotates outwardly around the second protrusion and make the first protrusion move in the escaping groove.

11. The card connector as claimed in claim 10, wherein the first guiding groove and the longitudinal groove extend along an insertion direction of the electronic card, the first guiding groove is located at a front side and an outer side of the second guiding groove.

12. The card connector as claimed in claim 10, wherein the second guiding groove is located in a bottom wall of the insulative housing, the second protrusion extends downwardly from the body portion and slides in the second guiding groove along with the slider.

13. The card connector as claimed in claim 12, wherein the first guiding groove is located in the bottom wall of the insulative housing, the first protrusion extends downwardly from the body portion and slides in the first guiding groove along with the slider.

14. The card connector as claimed in claim 12, further comprising a metal shell covering the insulative housing, the first guiding groove is formed on the shell and extends along a front to back direction, the first protrusion extends upwardly from an upper surface of the slider and slides in the first guiding groove along with the slider.

15. A card connector comprising:
an insulative housing cooperating with a cover to commonly define a card receiving space therebetween in a vertical direction;
a plurality of contacts disposed in the housing with contacting sections extending into the card receiving space;
an ejector mechanism including a slider positioned beside the card receiving space in a transverses direction perpendicular to said vertical direction, and essentially back and forth moveable relative to the housing, between inner and outer positions, in a front-to-back direction perpendicular to both said vertical direction and said transverse direction, a spring constantly urging the slider to move forwardly, and a pole having a fixed end and a free end moveable along a heart-shaped recess to control back and forth movement of the slider in said front-to-back direction;
an engaging portion associated with the slider for locking into a notch of an electronic card received in the card receiving space;
a restriction arrangement and a pivot arrangement formed on both said slider and one of said housing and said cover to have the slider in a normal position when the slider is moved between the outer position and the inner position for assuring the inserted card in a locked manner while allowing the slider to be pivoted in an oblique manner for unlocking the inserted card when the slider is moved to the outer position and experiences an external withdrawal force derived from the inserted card;
wherein the restriction arrangement and the pivot arrangement includes a groove formed in one of the slider and said one of the housing and the cover, and a protrusion formed in the other of the slider and said one of the housing and the cover under condition that said protrusion forms said pivot.

16. The card connector as claimed in claim 15, wherein a pivot is formed when said slider is pivoted at the outer position, and said pivot is essentially located inside of a position, in said transverse direction, where the spring imposes forces upon the slider.

17. The card connector as claimed in claim 16, wherein the slider is essentially in the normal manner at the outer position when no external withdrawal force exists so as to assure the inserted card will not be flipped out during ejection of the inserted card.

18. The card connector as claimed in claim 15, wherein the groove is formed in the housing.

19. The card connector as claimed in claim 16, wherein the heart-shaped recess in formed in the housing and the fixed end of the pole is secured to the slider.

* * * * *